US012032386B2

United States Patent
Thein et al.

(10) Patent No.: US 12,032,386 B2
(45) Date of Patent: Jul. 9, 2024

(54) METHOD FOR SAFEGUARDING A COMMUNICATION BETWEEN A FIRST AND A SECOND VEHICLE, CONTROL DEVICE, COMMUNICATION ARRANGEMENT AND VEHICLE ARRANGEMENT

(71) Applicant: Robert Bosch GmbH, Stuttgart (DE)

(72) Inventors: Christoph Thein, Hildesheim (DE); Frank Hofmann, Hildesheim (DE); Jens Schwardmann, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/394,652

(22) Filed: Aug. 5, 2021

(65) Prior Publication Data
US 2022/0043462 A1 Feb. 10, 2022

(30) Foreign Application Priority Data
Aug. 5, 2020 (DE) .......................... 102020209871.9

(51) Int. Cl.
*G05D 1/02* (2020.01)
*G01C 21/34* (2006.01)
(Continued)

(52) U.S. Cl.
CPC ....... *G05D 1/0295* (2013.01); *G01C 21/3415* (2013.01); *G05D 1/0022* (2013.01);
(Continued)

(58) Field of Classification Search
None
See application file for complete search history.

(56) References Cited

U.S. PATENT DOCUMENTS

| 10,712,748 B2 * | 7/2020 | Smartt | G08G 1/161 |
| 2008/0009985 A1 * | 1/2008 | Plishner | G05D 1/0295 |
| | | | 701/23 |

(Continued)

FOREIGN PATENT DOCUMENTS

| DE | 102014209199 A1 * | 11/2015 | ......... H04L 12/6418 |
| DE | 102015214968 A1 | 2/2017 | |

(Continued)

OTHER PUBLICATIONS

Machine translation of DE-102014209199-A1 (Year: 2015).*
Description of WO 2019203712 A1 (Year: 2019).*

*Primary Examiner* — Amelia Vorce
*Assistant Examiner* — Kyle S Park
(74) *Attorney, Agent, or Firm* — Michael Best & Friedrich LLP

(57) ABSTRACT

Method for safeguarding a communication between a first vehicle 3 and a second vehicle 4, wherein the first vehicle 3 has a first communication device and the second vehicle 4 has a second communication device, wherein the first vehicle 3 forms a leading vehicle and the second vehicle 4 forms a following vehicle, wherein data are interchanged between the first communication device and the second communication device by way of a wireless communication connection, wherein the communication connection has a transmission quality, wherein a future transmission quality is estimated and/or determined for the communication connection, wherein if the future transmission quality is below a minimum transmission quality then a countermeasure to improve the transmission quality is performed.

11 Claims, 2 Drawing Sheets

(51) Int. Cl.
  *G05D 1/00* (2024.01)
  *H04B 17/373* (2015.01)
  *H04B 17/382* (2015.01)
(52) U.S. Cl.
  CPC ......... *G05D 1/0027* (2013.01); *H04B 17/373* (2015.01); *H04B 17/382* (2015.01)

(56) References Cited

U.S. PATENT DOCUMENTS

| | | | |
|---|---|---|---|
| 2016/0278065 A1* | 9/2016 | Kim | G07C 5/0816 |
| 2017/0041760 A1* | 2/2017 | Alieiev | G01S 19/426 |
| 2017/0048156 A1* | 2/2017 | Simsek | H04B 17/309 |
| 2017/0229023 A1* | 8/2017 | Connor | G08G 5/0008 |
| 2018/0122236 A1* | 5/2018 | Murray | H04W 4/46 |
| 2019/0245647 A1* | 8/2019 | Alieiev | H04L 1/0017 |
| 2019/0380121 A1* | 12/2019 | Wu | H04W 36/03 |
| 2020/0059425 A1* | 2/2020 | Terechko | G05D 1/0088 |
| 2020/0267573 A1* | 8/2020 | Pfadler | H04W 4/44 |
| 2021/0074165 A1* | 3/2021 | Pfadler | B60W 30/165 |
| 2021/0126685 A1* | 4/2021 | Kang | H04B 7/0608 |
| 2021/0132630 A1* | 5/2021 | Bergquist | G05D 1/0293 |
| 2023/0074288 A1* | 3/2023 | Filippou | H04W 28/0236 |

FOREIGN PATENT DOCUMENTS

| | | | | |
|---|---|---|---|---|
| DE | 112016001612 T5 | 1/2018 | | |
| EP | 3621327 A1 | 3/2020 | | |
| WO | WO-2019203712 A1 * | 10/2019 | ............. | G08C 25/02 |

\* cited by examiner

METHOD FOR SAFEGUARDING A COMMUNICATION BETWEEN A FIRST AND A SECOND VEHICLE, CONTROL DEVICE, COMMUNICATION ARRANGEMENT AND VEHICLE ARRANGEMENT

BACKGROUND OF THE INVENTION

The subject of the invention is a method for safeguarding a communication between a first and a second vehicle.

Communication between two vehicles (V2V) and/or between vehicle and infrastructure (V2I) is widely used in technical fields. In particular in vehicle convoys, where multiple vehicles follow a leading vehicle, communication between the vehicles is of central significance. It is important for this communication and/or these connections to have low latency and to be robust. By way of example, interruptions in the communication and/or in the connection can lead to collisions and/or breakup of the convoy.

The document DE 11 2016 001 612 T5, which probably forms the closest prior art, relates to an apparatus and a method for managing a communication for a vehicle. The apparatus is configured such that data are received from a multiplicity of communication systems, the data being marked with information that assigns the data to one source of the data in each case in order to determine a rank for the multiplicity of communication systems on the basis of a quality analysis.

SUMMARY OF THE INVENTION

A method for safeguarding a communication between a first vehicle and a second vehicle is proposed. Furthermore, a control device, a communication arrangement and a vehicle arrangement are proposed. Preferred and/or advantageous embodiments emerge from the subclaims, the description and the accompanying figures.

A method for safeguarding a communication between a first and a second vehicle is proposed. In particular, the method is designed to safeguard the communication of a V2V and/or V2 communication. By way of example, safeguarding is understood to mean maintaining the stability of and/or protecting the communication, for example as a quality assurance, stability assurance or reliability improvement or maintenance of the communication. The communication is in particular a wireless communication for data interchange between the first and second vehicles in one or both directions. In particular, the first vehicle and the second vehicle are of the same kind of design, which means that for example a first vehicle can also form a second vehicle. In particular, the method can also be designed for communication between multiple vehicles, for example a first vehicle, a second vehicle, a third vehicle and/or further vehicles. The first vehicle, the second vehicle and, if appropriate, further vehicles preferably form a vehicle convoy and/or vehicle combination.

The first vehicle has a first communication device and the second vehicle has a second communication device. In particular, the first and second communication devices can be of identical design. The communication device is preferably designed to transmit and/or receive data, in particular of the communication. By way of example, the communication device can form a radio device, an optical transmission and/or reception device.

In particular, the first vehicle is referred to and/or regarded as a leading vehicle, the second vehicle being referred to and/or regarded as a following vehicle. In particular, the leading vehicle and the following vehicle are part of a convoy and/or form the convoy. The following vehicle is in particular designed to follow the leading vehicle, for example to follow it at a distance. The vehicles can be in the form of automobiles, trucks and/or agricultural, forestry and/or construction vehicles, for example.

Data are interchanged between the first communication device and the second communication device by means of a wireless communication connection. The interchange of the data is in particular part of the communication and/or forms the communication. The wireless communication connection comprises and/or forms a radio connection, a Bluetooth connection, an optical connection, in the visible or infrared range, and/or other wireless connections, for example. The wireless communication connection is in particular in the form of a data coupling of the first and second communication devices. In particular, the interchange takes place in both directions, that is to say from the first to the second from the second to the first communication device. Alternatively, there can be provision for unilateral data interchange by means of the communication connection, for example from the first to the second communication device.

The communication connection has a transmission quality and/or is characterizable by means of a transmission quality. By way of example, the transmission quality comprises and/or forms a signal strength, a transmission speed, for example kilobits per second, a noise component, for example how many errors and/or perturbations are inherent in the communication connection. The transmission quality is in particular dependent on the first communication device, the second communication device, surroundings parameters, for example a humidity, or on electromagnetic radiation fields, and/or on a geometry of the devices, modules and/or vehicles taking part in the method.

A future transmission quality is estimated, determined and/or extrapolated for the communication connection. Future transmission quality is understood to mean for example a transmission quality of the communication connection shifted into the future by a time interval Δt compared to a present time, Δt preferably being greater than or equal to one millisecond, in particular greater than or equal to one second. The determination of the future transmission quality is for example suitable for being able to assess the change in the transmission quality in the future, for example whether the transmission quality will decrease, remain the same or increase in future. By way of example, the future transmission quality is determined on the basis of the assessment of interfering influences on the communication connection.

To safeguard the communication, in particular in order to prevent and/or reduce termination, breakdown, a loss of information from the communication between the first and second vehicles, a check is performed to determine whether the estimated, determined and/or ascertained future transmission quality of the communication connection fulfills and/or exceeds a minimum transmission quality. The minimum transmission quality is for example a transmission quality that there must at least be in order to permit a reliable, complete and/or correct data transmission between the first and second vehicles. The minimum transmission quality can specifically be formed digitally with values 1 and 0, for example communication connection intact and communication connection broken. If the future transmission quality does not reach the minimum transmission quality, a countermeasure and/or countermeasures to improve, increase and/or assure the quality of the communication connection is/are initiated and/or taken. One countermeasure is for example to improve the communication connection and/or the transmission quality of the communication connection, for example by reducing interfering influences on the communication connection, by improving the performance of the communication devices and/or yet other physical and/or mechanical countermeasures.

The invention is based on the consideration that in order to safeguard, in particular to ensure, a reliable, permanent and stable communication connection, between vehicles, a future transmission quality can be used to react in good time and to proactively maintain the communication connection. By way of example, just a minimum quality of the currently existing communication connection has been determined to date, which means that measures were able to be initiated only in the event of actual termination and/or a drop below the quality of the communication connection. The proactive ascertainment and advance planning of the transmission quality in the future can allow a vehicle communication with improved reliability and more robust data transfer.

It is particularly preferred that the future transmission quality is estimated, ascertained and/or extrapolated on the basis of a road profile, a route planning, a relative position of and/or between the first vehicle and the second vehicle, a vehicle geometry and/or transmission parameters of the communication device and/or communication connection. By way of example, the transmission quality in the future is determined on the basis of a planned route, the profile of the road in front of the vehicle and/or a topology of the surroundings. By way of example, the road profile, the vehicle route and/or the topology particularly influence the transmission quality of a wireless connection during cornering and/or during ascents and descents, for example because parts of the vehicle interfere with, shield and/or attenuate the communication connection. Furthermore, there can be provision for future transmission quality to be determined on the basis of a relative position between the first and second vehicles, for example a lateral offset between the vehicles and/or a vehicle geometry, the vehicle geometry comprising the arrangement, position and/or bearing of the communication devices in the vehicle, for example. Transmission parameters of the first and/or second communication devices can furthermore be used to ascertain the future transmission quality, for example an orientation of the communication devices, for example of the transmitter and/or the receiver, communication parameters such as frequency, wavelengths and/or transmission protocols. Furthermore, the ascertainment of the future transmission quality can be based on a simulation, on weather data and/or data from sources of interference.

It is particularly preferred that the future transmission quality is estimated, ascertained and/or extrapolated on the basis of a line of sight check between the first vehicle and the second vehicle, specifically between the first communication device and the second communication device. The line of sight check is for example to determine the check on a connection, in particular a straight line and/or a geodetic line, between the first vehicle and the second vehicle and/or specifically between the first communication devices and the second communication device. By way of example, the future transmission quality is estimated and/or ascertained on the basis of the line of sight check. Based on the consideration that a better transmission quality can be assumed for a completely free line, connection, in particular without obstacles and/or attenuation, than if parts of the vehicle, external obstacles and/or sources of interference are situated in the region of the line of sight, it is thus possible for an improved communication to be provided. Specifically, it is assumed for example that the transmission quality is higher for a shorter line of sight than for a longer line of sight.

The countermeasure and/or the countermeasures comprise for example adapting, adjusting and/or altering one or more communication parameters of the first communication device and/or of the second communication device. A communication parameter is for example a transmission power, a transmission frequency, a transmission wavelength, a modulation method, an antenna orientation and/or a beam shaping. By way of example, to improve transmission quality, the communication devices, or the communication parameters thereof, specifically the transmission power, frequency and/or beam shaping, can be adapted such that the future transmission quality of the communication connection is greater than or equal to the minimum transmission quality.

One configuration of the invention provides for the countermeasure and/or the countermeasures to comprise controlling the first vehicle and/or the second vehicle. By way of example, the countermeasure can be to prompt the first and/or second vehicle to adapt its trajectory, its lateral offset, speed and/or cornering such that the transmission quality corresponds at least to the minimum transmission quality and/or the line of sight between the first and second communication devices is subject to less interference, is shorter and/or is improved. In particular, the first and/or second vehicle is/are controlled as countermeasures such that the first and/or second vehicle remains within the lane during control, and/or said vehicle's own lane is at most fully utilized. Furthermore, there can be provision for the countermeasure to be to control a vehicle during cornering such that the curve is fully utilized, for example such that the line of sight is maintained as far as possible.

In particular, the countermeasure provided for can be a replanning of a route, in particular the journey route, a trajectory, an acceleration, a speed and/or a steering of the first vehicle and/or of the second vehicle. By way of example, depending on the topology, e.g. hills and valleys and/or curves, a route may be unsuitable for traveling in a convoy, which means that the countermeasure is to plan a route and/or trajectory that ensures a better transmission quality.

It is particularly preferred that the first communication devices and/or the second communication devices each comprise at least one antenna module. An antenna module can be for example in the form of a radio antenna and/or in the form of an optical antenna, for example LED and/or photodiode. In particular, the antenna module can have an antenna orientation, the antenna orientation predefining an orientation of a receiving antenna, for example. The communication connection is in the form of a data connection, for example radio connection or optical connection, between two antenna modules, in particular the antenna module of the first vehicle and of the second vehicle. The data connection between the antenna modules can in particular be a protected, for example encrypted, data connection. The future transmission quality is preferably determined, ascertained and/or estimated on the line of sight check and/or a line of sight between the antenna modules connected and/or to be connected for data purposes. In particular, the future transmission quality is determined, ascertained and/or estimated on the basis of an arrangement position of the antenna modules in the respective vehicle. By way of example, antenna modules are mounted in side-view mirrors, to the left or right, or at different positions on a vehicle, different lines of sight being obtained, and/or different parts interfering with the line of sight, for different arrangement positions. This configuration is based on the consideration that the arrangement of the antenna modules influences the transmission quality, for example that the arrangement of the antennas to the left or right significantly influences cornering.

By way of example, the method provides for the first and/or the second communication devices to have a plurality of antenna modules, at least two, specifically at least five or ten antenna modules. By way of example, a vehicle and/or a communication device can comprise an antenna module in the left and right front, middle and/or rear section of the vehicle, which means that different lines of sight result for different combinations of connected antenna modules. In particular, there is provision for preferably precisely two antenna modules, one belonging to the first vehicle and one belonging to the second vehicle, to be connected for a communication connection for data purposes, it being possible to change between antenna modules within a vehicle. By way of example, the first vehicle comprises a left antenna module and a right antenna module, the second vehicle having a central antenna module, which means that the data connection can be in the form of a connection from the left antenna module of the first vehicle to the central antenna module of the second vehicle or in the form of a data connection from the right antenna module of the first vehicle to the central antenna module of the second vehicle. The countermeasure in the event of the future transmission quality being below the minimum transmission quality can be for example to change between antenna modules of a communication device that take part in the data coupling to the other vehicle, for example so as to reduce tuning operations during cornering or ascents and descents.

It is particularly preferred that the first vehicle and/or the second vehicle have a left and a right antenna module, for example on the side-view mirrors. The countermeasure can be for example to change between the left and right antenna modules taking part in the data connection between the first and second vehicles. Preferably, the data connections are in the form of a connection from the left antenna module of the first vehicle to the left antenna module of the following vehicle or in the form of a data connection from the right antenna module of the first vehicle to the right antenna module of the second vehicle, the countermeasure being for example to change the data connection between left and right.

A further subject of the invention is formed by a control device for performing the method as described previously. The control device comprises an evaluation module, wherein the evaluation module is designed and/or configured to ascertain, determine and/or assess a future transmission quality between a first communication device of a first vehicle and a second communication device of a second vehicle. The evaluation module is furthermore designed to determine, select and/or initiate countermeasures if the future transmission quality is below a minimum transmission quality. By way of example, the control device is designed to control and/or regulate the first vehicle, the second vehicle, the first communication device and/or the second communication devices.

A further subject of the invention is formed by a communication device comprising the first communication devices, the second communication devices and the control device as described previously. The first communication device and the second communication devices are designed for arrangement in a vehicle. Furthermore, the first communication devices and the second communication devices are designed for data connection to one another, the data connection forming a communication connection. The communication connection has a transmission quality. The evaluation module and/or the control device is designed to determine a future transmission quality for the communication connection and to determine, assess and/or initiate countermeasures to improve the transmission quality if the future transmission quality is below a minimum transmission quality.

A further subject is formed by a vehicle arrangement comprising a first vehicle and a second vehicle. The vehicle arrangement comprises the communication arrangement as described previously, the first communication device being arranged in the first vehicle and the second communication device being arranged in the second vehicle. The vehicle arrangement is designed for traveling in a convoy, the first vehicle and/or the second vehicle preferably forming a truck or automobile.

BRIEF DESCRIPTION OF THE DRAWINGS

Further advantages, effects and configurations of the invention emerge from the accompanying figures and the description thereof. In the figures.

DETAILED DESCRIPTION

Figure 1A:
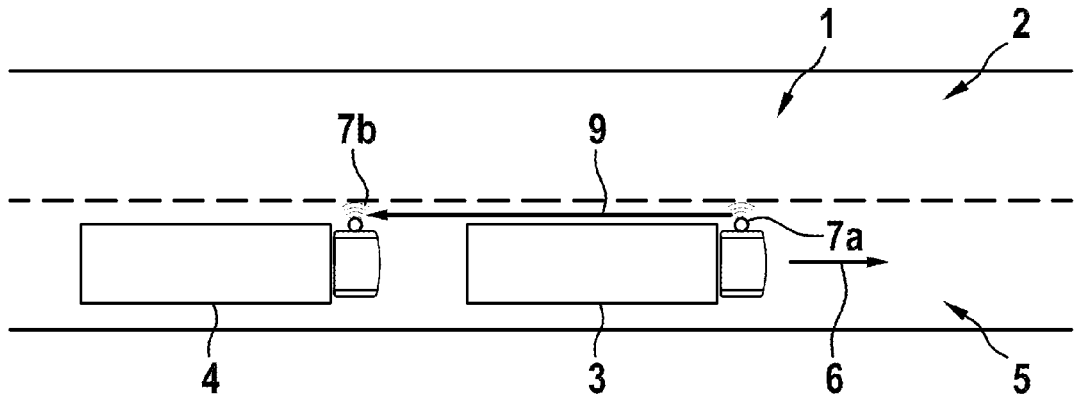
FIGS. 1a, b & c show exemplary embodiments and vehicle arrangements.

FIG. 1a shows an exemplary embodiment of a vehicle arrangement 1 on a road 2. The vehicle arrangement 1 comprises a first vehicle 3 and a second vehicle 4, wherein the second vehicle 4 as a following vehicle follows the first vehicle 3 as leading vehicle. The first and second vehicles 3, 4 form and/or are part of a vehicle convoy, said vehicles following a route 6 in a lane 5 of the road 2. For reliable convoy travel there is provision for a vehicle-to-vehicle communication between the second and first vehicles and/or further vehicles.

The first vehicle 3 and the second vehicle 4 each have a communication device, the communication devices each having an antenna module 7a and 7b. The antenna modules 7a,b are arranged on the left side-view mirrors of the vehicle 3, 4 and are in the form of a radio antenna, for example a WLAN antenna. The antenna 7a of the first vehicle is coupled for data purposes to the antenna module 7b of the second vehicle 4. The data coupling between the antenna modules 7a,b renders the communication connection available for communication between the vehicles 3, 4. The communication connection is in the form of a radio connection and can be attenuated for example by vehicle parts, obstacles and/or weather conditions. A very good data connection and/or communication connection can be obtained for a free visual connection 9 between the antenna modules 7a and 7b, since the connection is thus completely unattenuated.

Figure 1B:
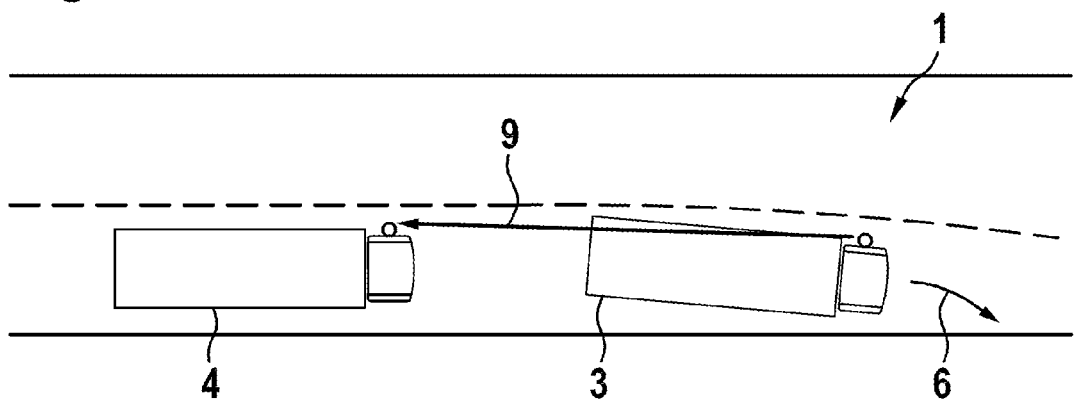

FIG. 1b shows the vehicle arrangement 1 from FIG. 1a, the first vehicle 3 steering to the right as per the route 6, resulting in the first vehicle 3 being in an oblique position relative to the second vehicle 4. The second vehicle 4 is still traveling straight on here without having been steered. Part of the visual connection 9, for example shortest connection between the antenna modules 7a and 7b, runs through the first vehicle 3, resulting in an attenuation of the data connection between the first vehicle 3 and the second vehicle 4. This attenuation can result in a termination or a loss of information in the communication between the first and second vehicles, for example. The method avoids attenuation and/or counteracts it.

Figure 1C:
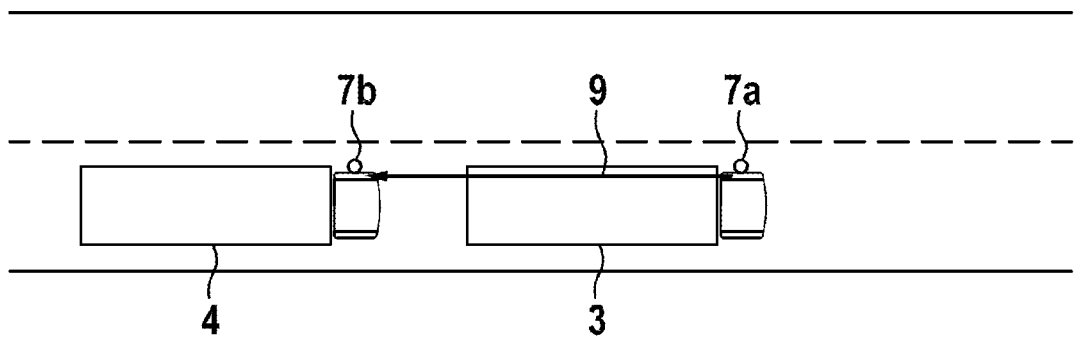

FIG. 1c shows the vehicle arrangement from FIG. 1a, there being a lateral offset between the first vehicle 3 and the second vehicle 4 here, even though the speeds and directions of travel of the first and second vehicles 3, 4 are identical. The offset stems from a lateral offset in the first vehicle 3 relative to the second vehicle 4 in the direction of the center of the road. Part of the visual connection 9 between the first vehicle 3 and the second vehicle 4, or the antenna modules 7a and 7b, leads through the first vehicle 3, which means that an attenuation can be assumed. The method would determine such an attenuation early, before it arises, and initiate countermeasures, for example would steer the first vehicle 3 further to the right, or away from the center of the road, so that the visual connection 9 between the first vehicle 3 and the second vehicle 4 is no longer attenuated by the first vehicle 3.

Figure 2:
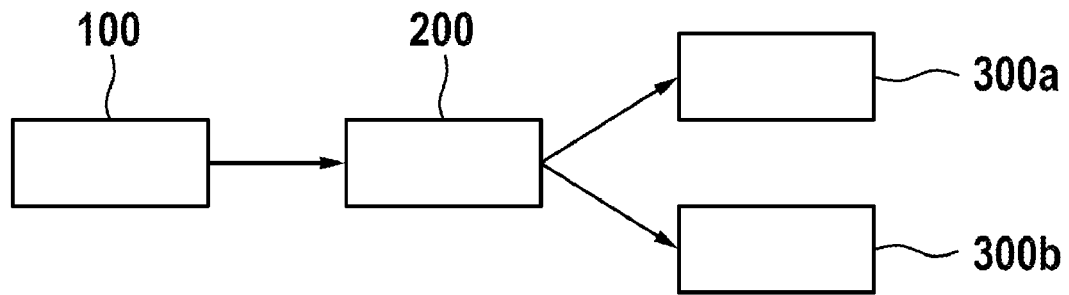
FIG. 2 shows a schematic sequence of an exemplary embodiment of the method with countermeasures.

FIG. 2 schematically shows a sequence of such a method. A vehicle convoy, or the first and second vehicles 3, 4, is guided by a control device in a control step 100. By way of example, this involves the journey route, speeds, accelerations and/or steering being planned and/or set. The data from step 100, for example journey route, maps of the surroundings, speeds and/or accelerations, are provided to a sight check step 200. In sight check step 200, a future transmission quality of a data connection and/or communication between the first vehicle and the second vehicle 4 is determined. By way of example, this is accomplished by determining the visual connection 9. Specifically, an examination is performed to determine whether and/or how much of the visual connection 9 is inside one of the vehicles and/or attenuated by surroundings for the future journey route profile.

Based on the sight check, countermeasures are performed in countermeasure steps 300a, b. Both countermeasure steps 300a, b can be carried out as the countermeasure, or one of the countermeasures in each case. In countermeasure step 300a, the first or second vehicle is prompted to adapt its route, trajectory and/or mode of driving such that the line of sight is undisturbed. In countermeasure step 300b, the communication device of the first and/or second vehicle is prompted to take measures that boost and/or safeguard the communication connection, for example to change between antenna modules and/or to adapt transmission parameters (transmission power or frequencies).

Figure 3:
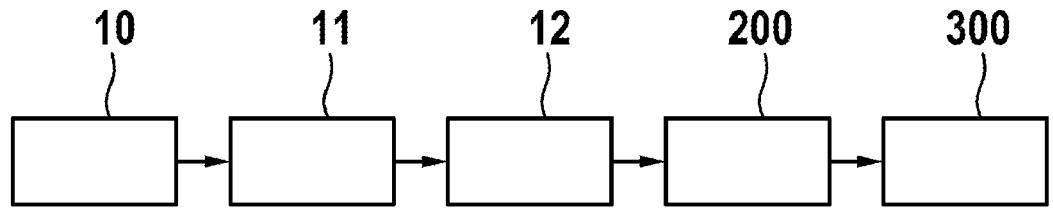
FIG. 3 shows a further exemplary embodiment of a method for safeguarding the communication.

FIG. 3 shows a further example of a method for safeguarding a communication between a first vehicle 3 and a second vehicle 4. This involves the trajectory 11 of the vehicles being predetermined and/or estimated for the future on the basis of a planned journey route 10, the trajectory 11 being taken as a basis for ascertaining a relative position and/or bearing 12 of the vehicles 3, 4 for the future. The line of sight 9 is ascertained and/or estimated on the basis of the future position and/or bearing 12, with the line of sight check 200 being performed. Based on the line of sight check 200, the countermeasure steps 300 are initiated when required.

The invention claimed is:

1. A method for safeguarding a communication between a first vehicle (3) having a first communication device and a second vehicle (4) having a second communication device and following the first vehicle (3), the method comprising:

interchanging data between the first communication device and the second communication device by way of a direct wireless communication connection, estimating a future transmission quality of the direct wireless communication connection based on a planned route of the first vehicle (3) and the second vehicle (4) and a line of sight check (200) between the first vehicle (3) and the second vehicle (4) and/or between the first communication device and the second communication device, and performing a countermeasure to improve a transmission quality of the direct wireless communication device when the future transmission quality is below a minimum transmission quality, the countermeasure including adjusting an operation of at least one selected from the group consisting of the first communication device, the second communication device, the first vehicle (3), and the second vehicle (4).

2. The method according to claim 1, wherein the future transmission quality is estimated based on a road profile, a relative position between the first vehicle (3) and the second vehicle (4), a vehicle geometry and/or transmission parameters of the first communication device and/or the second communication device.

3. The method according to claim 1, wherein the countermeasure comprises adapting communication parameters of the first communication device and/or the second communication device.

4. The method according to claim 1, wherein the countermeasure comprises replanning a route planning, a trajectory and/or a steering of the first vehicle (3) and/or of the second vehicle (4).

5. The method according to claim 1, wherein the first communication device and the second communication device each comprise at least one antenna module (7a, b), wherein the communication connection forms the direct wireless communication connection from an antenna module (7a) of the first communication device to an antenna module (7b) of the second communication device, wherein the future transmission quality is determined based on an arrangement position of the antenna modules (7a, b) in the respective vehicle (3, 4).

6. The method according to claim 5, wherein the first vehicle (3) or the second vehicle (4) has a left antenna module (7a, b) and a right antenna module (7a, b), and the countermeasure comprises changing between the left and right antenna modules (7a, b) as the antenna module (7a, b) connected for data purposes.

7. The method according to claim 1, wherein the first communication device and/or the second communication device has a plurality of antenna modules (7a, b), wherein the countermeasure comprises changing between the antenna modules (7a, b) connected for data purposes.

8. The method according to claim 1, wherein the future transmission quality is estimated based on a relative position of at least one of the first vehicle (3) and the second vehicle (4) causing attenuation.

9. The method according to claim 1, wherein the future transmission quality is estimated based on a relative position of at least one of the first communication device and the second communication device causing attenuation.

10. An electronic control device for safeguarding a direct wireless communication between a first vehicle (3) having a first communication device and a second vehicle (4) having a second communication device and following the first vehicle (3), the electronic control device configured to determine a future transmission quality between the first communication device and the second communication device based on a planned route of the first vehicle (3) and the second vehicle (4) and a line of sight check (200) between the first vehicle (3) and the second vehicle (4) and/or between the first communication device and the second communication device and determine and perform a countermeasure if the future transmission quality is below a minimum transmission quality, the countermeasure including adjusting an operation of at least one selected from the group consisting of the first communication device, the second communication device, the first vehicle (3), and the second vehicle (4).

11. A vehicle arrangement comprising:
a first vehicle (3),
a second vehicle (4), and
an electronic control device for safeguarding a direct wireless communication between the first vehicle (3) having a first communication device and the second vehicle (4) having a second communication device and following the first vehicle (3), the control device being configured to:
determine a future transmission quality between the first communication device and the second communication device based on a planned route of the first vehicle (3) and the second vehicle (4) and a line of sight check (200) between the first vehicle (3) and the second vehicle (4) and/or between the first communication device and the second communication device, and
determine and perform a countermeasure when the future transmission quality is below a minimum transmission quality, the countermeasure including adjusting an operation of at least one selected from the group consisting of the first communication device, the second communication device, the first vehicle (3), and the second vehicle (4).

* * * * *